ically for

(12) United States Patent
Li et al.

(10) Patent No.: US 10,013,553 B2
(45) Date of Patent: Jul. 3, 2018

(54) PROTECTING SOFTWARE APPLICATION

(71) Applicant: IRDETO B.V., Hoofddorp (NL)

(72) Inventors: Yunpeng Li, Beijing (CN); Chunming Qie, Beijing (CN)

(73) Assignee: IRDETO B.V., Hoofddorp (NL)

( * ) Notice: Subject to any disclaimer, the term of this patent is extended or adjusted under 35 U.S.C. 154(b) by 218 days.

(21) Appl. No.: 14/779,207

(22) PCT Filed: Mar. 27, 2013

(86) PCT No.: PCT/CN2013/000352
§ 371 (c)(1),
(2) Date: Sep. 22, 2015

(87) PCT Pub. No.: WO2014/153680
PCT Pub. Date: Oct. 2, 2014

(65) Prior Publication Data
US 2016/0055333 A1 Feb. 25, 2016

(51) Int. Cl.
*G06F 21/00* (2013.01)
*H04L 29/06* (2006.01)
*G06F 21/55* (2013.01)

(52) U.S. Cl.
CPC ...... *G06F 21/554* (2013.01); *G06F 2221/033* (2013.01)

(58) Field of Classification Search
CPC .......... G06F 21/554; G06F 2221/033
See application file for complete search history.

(56) References Cited

U.S. PATENT DOCUMENTS 6,539,266 B1 * 3/2003 Ishikawa ............... G06F 21/565
700/21
7,159,234 B1 * 1/2007 Murphy ............... G06F 11/2028
714/11

(Continued)

FOREIGN PATENT DOCUMENTS

CN       101040264 A       9/2007
CN       101128833 A       2/2008
(Continued)

OTHER PUBLICATIONS

Gagnon et al., "Software Protection through Anti-Debugging", IEEE Security & Privacy, May/Jun. 2007, pp. 82-84.
(Continued)

*Primary Examiner* — Lisa C Lewis
(74) *Attorney, Agent, or Firm* — Rimon, P.C.; Marc Kaufman

(57) ABSTRACT

There is provided a method of protecting the execution of a software application, the method performed by a plurality of processes comprising a process for executing the software application and a plurality of protection processes, wherein each protection process in the plurality of protection processes is configured to: monitor a process state of at least one other process in the plurality of processes to determine whether said process state corresponds to a predetermined process state; and perform a predetermined action in response to a determination that said process state corresponds to the predetermined process state; wherein the plurality of protection processes are configured such that a process state of the process for executing the software application is monitored by at least one protection process and a process state of each protection process is monitored by at least one other protection process in the plurality of protection processes. Additionally provided is a computer (Continued)

program and a system for carrying out the method and a computer readable medium for storing such a computer program.

13 Claims, 4 Drawing Sheets

(56) References Cited

U.S. PATENT DOCUMENTS

| | | | |
|---|---|---|---|
| 2002/0184295 A1 | 12/2002 | Bartley | |
| 2006/0098814 A1* | 5/2006 | Al-Khoraidly | G06F 7/725 380/28 |
| 2010/0020968 A1* | 1/2010 | Jin | H04N 5/913 380/200 |
| 2013/0139264 A1* | 5/2013 | Brinkley | G06F 21/566 726/24 |
| 2014/0040149 A1* | 2/2014 | Fiske | G06Q 20/322 705/71 |

FOREIGN PATENT DOCUMENTS

| | | |
|---|---|---|
| CN | 101587456 A | 11/2009 |
| CN | 102629308 A | 8/2012 |
| DE | 102004050350 A1 | 4/2006 |
| EP | 2264635 A1 | 12/2010 |
| EP | 2352109 A1 | 8/2011 |
| EP | 2477110 A1 | 7/2012 |

OTHER PUBLICATIONS

Shields, "Anti-Debugging—A Developers View", http://www.veracode.com/images/pdf/whitepaper_antidebugging.pdf, pp. 1-15.
Shields, "Anti-Debugging Series—Part I" Veracode Security Blog: Application security research, security trends and opinions—Research, Dec. 2, 2008, pp. 1-3.
International Search Report and Written Opinion cited in corresponding International Application No. PCT/CN2013/000352 dated Jan. 2, 2014.
Extended European Search Report cited in corresponding European Application No. 13879861.6 dated Oct. 19, 2016.
Chinese Office Action for China Patent Application Serial No. 201380077006.2 dated Jan. 11, 2018, 14 pages.

* cited by examiner

PROTECTING SOFTWARE APPLICATION

The present application is the United States national stage of International Application No. PCT/CN2013/000352, filed Mar. 27, 2013, the entire content of which is incorporated herein by reference.

FIELD OF THE INVENTION

The present invention relates to a method of protecting the execution of a software application, and apparatus and computer programs for carrying out such a method.

BACKGROUND OF THE INVENTION

Operating systems are a well-known component of computer systems. An operating system (or OS) is a software application (or program), or group of software applications, which comprises computer code or instructions which are executed by the processor (or CPU) of a computer system upon which the operating system is run. The operating system manages the hardware resources of the computer system upon which it is run. These hardware resources include, for example, processors, memory, storage and input/output (IO) interfaces. The operating system allows other software applications to be run or executed on the computer system and provides various functionality and services, including interfaces to the hardware resources of the computer system, which support the running of other software applications. An operating system therefore forms a core or central component of a computer system and is responsible for the running of all other applications that are to be executed by the processor(s) of the computer system upon which it runs. As such, the operating system normally forms a trusted component of the computer system, which is also responsible for ensuring the security of the processing environment by preventing applications that are run by the operating system from negatively impacting or interfering with the operation of the hardware resources of the computer system or the other applications that are being run by the computer system. It is commonly a requirement, therefore, that software applications can only interact with the hardware resources of the computer system using the interfaces provided by, and managed by, the operating system.

Examples of well-known operating systems include Microsoft Windows, Mac OS X, Linux, BSD, IBM z/OS, Android and iOS, however, it will be appreciated that there are other operating system that may be used.

A software application comprises computer code or instructions which identify actions that a processor of a computer system is to take when it executes the software application. A software application that is being executed by a processor may be referred to as a task or process. When a software application is executed by a processor (i.e. during the execution of a process), the calculations and operations that are performed result in the generation (and potentially the subsequent alteration) of various data such as the intermediate results of calculations, physical memory addresses where data may be stored and indicators of which instruction is to be processed next. This data provides an indication of the processing state (or context) of the process and is typically stored in registers of the processor while the process is being executed. A process may therefore be considered as comprising a copy (or image) of the program code of the software application that is being executed and a current processing state.

A processor which comprises a single processing core is only capable of processing or executing a single instruction at a time and, as a result, can only execute a single software application at a time. A processor (or a group of processors) may, however, comprise multiple processing cores, in which case the processor can process multiple instructions at a time, with one instruction being processed by each processing core. A processor with multiple processing cores may therefore execute multiple software applications at a time. The concept of executing multiple software applications at the same time is referred to as multi-processing or multi-tasking. Most modern operating systems support multi-processing and manage the hardware resources that each process that is being run on the computer system may access to avoid any conflict or interference between the processes that are currently running. In order to support multi-processing, the operating system maintains information about the processes that are being run on the computer system. The operating system may store this information in special memory structures, which may be referred to as Process Control Blocks (PCBs). The nature of the information that is maintained may vary between different operating systems, however commonly includes information such as an identifier for the process, the hardware resources such as memory and I/O devices that are allocated to the process, as well as other control and security attributes for the process. It will be appreciated that much more information about processes may be maintained by the operating system. Furthermore, it will be appreciated that the operating system may maintain some of the information about the processes in other data structures, such as tables, which may be referenced back to a particular process by an identifier of the process. The state of execution of a process may therefore be considered to be a combination of its processing state and the additional information about the process that is maintained by the operating system.

Whilst multi-processing can be achieved by the presence of multiple processing cores in a computer system, most modern operating systems also enable multi-processing to be achieved (or at least emulated) by a concept known as concurrent execution of processes (or concurrent processing or concurrency). The concurrent execution of processes means that on a single processing core, multiple processes are processed during the same period of time. Concurrency is achieved by allowing the processing core to switch from executing a process to executing a different process, even if the processing of the process hasn't yet finished. This process of switching the process that is currently being processed may be referred to as context-switching. In order for context-switching to take place, it is necessary to save the processing state of the process that is currently being executed, before the context-switch to a different process happens. This means that when the processor switches back to processing that process, the processing state of the process can be reloaded and execution can be resumed from the point where the previous context-switch occurred. The operating system may support concurrency in several ways. The operating system may assist in storing the process state of the processes when they are context-switched out of the processor—this may be stored in the process control blocks. The operating system may also determine when, and in what order, each process is executed and how long each process is executed before the processor context-switches to a different process. This component of the operating system may be referred to as a scheduler. There are well-known strategies for determining when context-switching should take place, examples of such strategies include co-operative strategies, pre-emptive strategies and time-sharing strategies, however it will be appreciated that any such strategies may be used.

In addition to the multi-processing and concurrent execution of multiple processes by a computer system, various methods are also known which allow for a single process to contain multiple streams or threads of execution (which may be referred to simply as threads), such that different portions of code of the process can be executed at the same time or concurrently. This concept may also be referred to as multi-threading. Multi-threading means that different execution paths within a process can be followed at the same time, by executing instructions at the same time on different processing cores, or during the same time period, by executing the threads concurrently on the same processing core. In this respect, threads are similar to processes. However, whereas processes have their own allocated resources, threads share the resources of the process to which they belong. The operating system may support multi-threading, however, since threads share the processes to which they belong, it is also possible for multi-threading behaviour to be implemented (or at least emulated) by the program code of a particular application, without requiring the support of the operating system.

It is a well-known technique in software application development to utilise multiple co-operating processes and or threads in order to improve the operation of software applications.

The operating system may make information about the processes and/or threads that are running on a computer system available to other applications or a user of the computer system. The operating system may also provide an interface to other applications or the user of the computer system which allows interaction with the processes that are running on the computer system. As examples, this interface may allow the identification, diagnosis (i.e. as to whether the process is malfunctioning), suspension or termination of a particular process. It will be appreciated that the may be other ways in which interaction is enabled with the processes that are running on a computer system.

Software debugging tools, commonly referred to as software debuggers or just debuggers, are well known tools that may be used to investigate the operation of another software application. Software debugging tools are themselves software applications that interact with the operating system and/or hardware, such as the processor, of the operating system to control the execution of a running process executing a different software application and to observe the instructions that are executed by that process as well as the data structures that form the processing state of that process at various points during that process's execution. In this manner debuggers enable the operation of a process to be investigated and the functionality of the software application to be derived. Debuggers may also provide additional functionality which aid the user of the debugger in understanding the process or software application that is being debugged. As examples, the software debugger may include other tools such as a disassembler or a decompiler to display the code in a higher level language such as source code that may be easier for the user to understand. Debuggers are commonly used by programmers as part of their normal application development and/or maintenance activities, such as, for example, investigating and fixing errors or bugs in a software application.

In general, debuggers work by setting breakpoints in the execution of a software application. These breakpoints result in the execution of the application being stopped at the breakpoint and control being passed to the debugger. The debugger is then able to observe the program code or instructions that were being run at that breakpoint as well as the current state of the application's data structures.

In practice, the operation of a debugger may be supported by functionality provided by various subsystems with a computer system. Supporting functionality for debugging may, for example, be provided at the hardware level, for example by the CPU, which may provide special debug registers, tracing support and interrupt instructions that are designed to support debugging. Similarly, debugging functionality may, for example, be embedded within the operating system. Different debugging tools may make use of different elements of debugging support functionality provided by the different layers of the computer system and may therefore operate in a variety of different ways.

When a program (or software) is being executed by a processor, the environment in which the execution is being performed is a so-called "white-box" environment if the user (or a third party) has access to the processing so that the user can observe and alter the execution of the program (e.g. by running a suitable debugger).

When a software application is run in a white-box environment, a third party or attacker who does not have access to the original source code for the software application may attempt to use debugging tools to deduce information about the operation of a software application. This process may also be referred to as reverse-engineering of the software application. An attacker may use the knowledge obtained from reverse-engineering to meet their own goals, such as, for example, identifying attack points for an exploit, bypassing protection measures to allow unauthorised distribution of the application or modifying the application to include malicious code. There are a number of debugging tools which have been created with sophisticated automated facilities to aid in such reverse-engineering attacks.

Various techniques are known which aim to make it more difficult to debug a software application. These techniques may be referred to as anti-debugging techniques. As discussed above, there are a range of different techniques that may be used to debug a software application by utilising the various debugging support functionality provided by different layers or parts of the computer system. Each of these debugging techniques may result in artefacts or side effects occurring within the processing environment which may be detected. The different debugging techniques may also have their own respective weaknesses, in so far as they may be unable to handle or monitor particular operations that occur within a process. Generally, methods of anti-debugging rely on exploiting these side effects or weaknesses to detect or disable the operation of a debugger. The following are examples of the types of anti-debugging techniques that may be employed to protect a software application from being debugged:

Hardware and register based anti-debugging involves monitoring the data stored in the registers of the CPU itself. As mentioned above, some CPU's provide support for debugging by way of specific registers that can be used to allow breakpoints in the execution of an application. It is possible therefore to detect the operation of a debugging tool by monitoring the status of these registers. If the operation of a debugging tool is detected, the application may take an appropriate action to frustrate the debugging attempt.

Application Programming Interface (API) based anti-debugging involves calling various API methods of the Operating System, which can reveal that a debugger is operating on an application. Some of these API methods may be provided by the operating system with the express purpose of allowing an application to determine whether it is being debugged. Others of the API methods may be affected by the operation of a debugger, such that the use of a debugger can be determined by checking the operation of these methods, even though the purpose for including these API methods in the operating system may not have been expressly for the purpose of allowing an application to determine whether it is being debugged. Once the operation of a debugger is detected, the application may then take an appropriate action to frustrate the debugging attempt.

Process and thread blocking detection anti-debugging involves directly checking the process and/or thread management information maintained by the operating system.

Modified code anti-debugging is based on the principle that some debuggers insert breakpoints into an application by modifying the code of the application to include special instructions that cause the processor to pass control of the execution back to the debugger. It is possible to detect the inclusion of these breakpoints in the executed code by carrying out an Integrity Verification (IV) check, such as, for example, a cyclic redundancy check (CRC), to check whether the current image of the application that is being executed corresponds to an image of the application that hasn't been modified (i.e. to include breakpoints). By carrying out this self inspection or integrity verification, the application can detect whether it is being run under the control of a debugger and take an appropriate action to frustrate the debugging attempt.

Exception-based anti-debugging is based on the principle that certain exceptions that might be raised during the execution of a software application are handled differently when the application is being run under the control of a debugger than when the application is run normally. As an example, some debuggers may handle certain types of exceptions, such that the corresponding exception handling code in the application is never called when the application is run under the control of a debugger, yet would have been called were the application run normally. Conversely, other exceptions may be handled by the application when it is run normally, but are not correctly handled when run under a debugger, thereby causing the application to crash or terminate when it is run under the control of a debugger. Again, the operation of a debugger can be detected by the use of such exceptions and the application may then take an appropriate action to frustrate the debugging attempt.

Timing and latency based anti-debugging involves checking the timings at various points in the execution of the application to determine whether there is significant latency or delay between the two points of the execution. If there is a significant delay, then this code by indicative of the execution of the application being interrupted through the operation of a debugging tool. Again, having detected the operation of a debugging tool, the application may take an appropriate action to frustrate the debugging attempt.

It will be appreciated that other types of anti-debugging techniques may be used. Furthermore, it will be appreciated that the above-described anti-debugging techniques are broad categories of types of techniques that may be used and that within each of these categories there may be many different implementations of the type of anti-debugging technique, each of which may be tailored to the nuances of an individual debugger or operating system.

SUMMARY OF THE INVENTION

As discussed above, when a software application is run in a white-box environment, it is possible for the user to attempt to reverse-engineer the software application. Typically, a reverse-engineering attempt will involve the use of a software debugging tool by an attacker to deduce the operation of the software application. Having determined the operation of the software application, the attacker may then use this knowledge to meet their own goals. As examples, the attacker may use this knowledge to identify weaknesses in the application so as to identify an exploit that may be used in the production of malware. Alternatively, the attacker may use the knowledge to bypass any protection measures that may be used by the application, this may then enable the attacker to distribute the application without authorisation. The attacker might also use the knowledge to modify the application by inserting his own malicious code into the application, the modified application may then be distributed such that the malicious code is executed by the computer systems of the modified application. Due to the potential profitability of these activities, the rate of such reverse-engineering attacks on commercial applications is increasing.

Although various methods of preventing the use of a software debugging tool on a software application are known, as discussed above, these methods are too diverse, commonly applying particular techniques that are specific to the nuances of particular software debugging tools or operating systems. To sufficiently protect a software application from being debugged, it may be necessary to utilise a large number of anti-debugging techniques to provide reasonable depth and coverage over different debugging tools and operating systems so as to sufficiently frustrate reverse engineering attacks that an attacker is deterred from reverse engineering a particular software application. Given the range and number of anti-debugging techniques that are required to sufficiently protect a software application, the inclusion of anti-debugging techniques in an application can involves making significant changes to the applications code and results in additional development time, complexity and cost.

It is therefore desirable to protect a software application from reverse-engineering attacks, particularly those involving software debugging tools, in a manner which does not require such widespread modification to an application's code and which can be implemented easily, quickly and therefore at low cost from a software development perspective.

According to a first aspect of the invention, there is provided a method of protecting the execution of a software application, the method performed by a plurality of processes comprising a process for executing the software application and a plurality of protection processes, wherein each protection process in the plurality of protection processes is configured to: monitor a process state of at least one other process in the plurality of processes to determine whether said process state corresponds to a predetermined process state; and perform a predetermined action in response to a determination that said process state corresponds to the predetermined process state; wherein the plurality of protection processes are configured such that a process state of the process for executing the software application is monitored by at least one protection process and a process state of each protection process is monitored by at least one other protection process in the plurality of protection processes.

In some embodiments of the invention, each protection process is further configured to monitor the process state of the at least one other process to determine whether said process state corresponds to a second predetermined process state.

In some embodiments of the invention, one of the plurality of protection processes comprises the process for executing the software application.

In some embodiments of the invention, the predetermined process state may be defined positively. For example, the predetermined process state may correspond to a process state that is indicative of a reverse-engineering attack, such as the use of a software debugging tool. In other embodiments of the invention, the predetermined process state may be defined negatively. For example, the predetermined process state may be the absence of a particular process state, such as a process state which would be expected to occur during "normal" execution.

In some embodiments of the invention, the predetermined action comprises one or more of: causing the execution of the software application to be terminated; causing the execution of the software application to be passed to an error handling component; and/or causing the execution of the plurality of protection processes to be terminated.

In some embodiments of the invention, the plurality of protection processes are generated and executed before the software application is executed such that each protection process is being monitored by at least one other protection process in the plurality of protection processes prior to the software application being executed.

In some embodiments of the invention, prior to execution of the software application, the predetermined action comprises causing the execution of the software application to be prevented.

In some embodiments of the invention, the software application is configured to identify itself to the plurality of protection processes when it is executed, such that the plurality of protection processes can monitor the process state of the process for executing the software application.

In some embodiments of the invention, each protection process is configured to monitor one other protection process and is in turn monitored by one other protection process, such that the plurality of protection processes forms a ring structure.

In some embodiments of the invention, the number of protection processes in the plurality of processes varies during the execution of the software application.

In some embodiments of the invention, the number of protection processes in the plurality of processes is such that a total time required to attack the plurality of processes is greater than a time taken by any one process in the plurality of protection processes to determine that the process state of the at least one other process being monitored corresponds to the predetermined process state.

In a second aspect of the invention, there is provided a computer program which, when executed by a processor, causes the processor to carry out a method according to the first aspect.

In a third aspect of the invention, there is provided a computer readable medium storing a computer program according to the second aspect.

In a fourth aspect of the invention, there is provided a system configured to carry out a method according to the first aspect.

BRIEF DESCRIPTION OF THE DRAWINGS

Embodiments of the invention will now be described, by way of example only, with reference to the accompanying drawings, in which.

DETAILED DESCRIPTION OF EMBODIMENTS OF THE INVENTION

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

Figure 1:
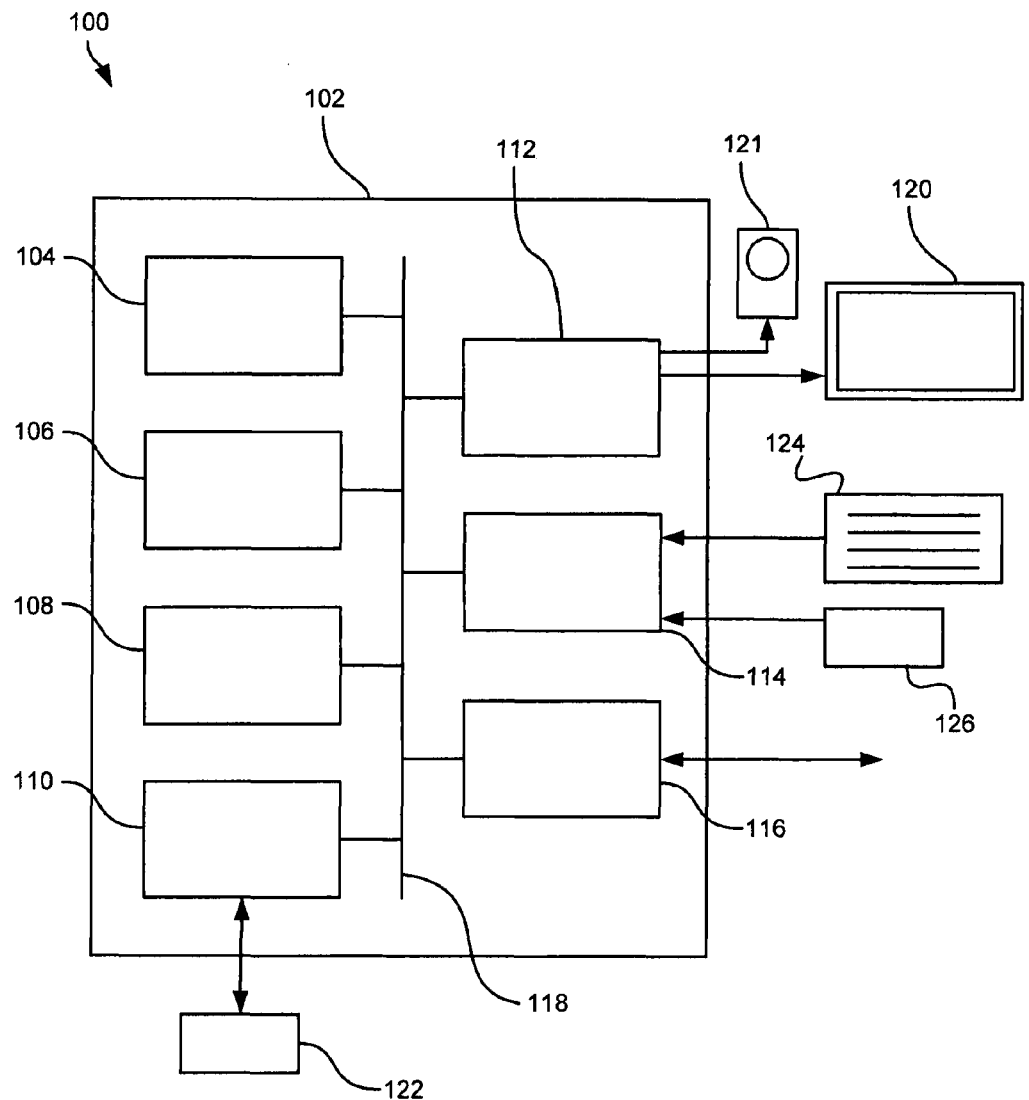
FIG. 1 schematically illustrates an exemplary computer system upon which the invention may run.

FIG. 1 illustrates an exemplary computer system 100 upon which the invention may run. The computer system 100 comprises a computer 102. The computer 102 comprises various hardware resources, such as: a storage medium 104, a memory 106, a processor 108, an interface 110, a user output interface 112, a user input interface 114 and a network interface 116, which are all linked together over one or more communication buses 118.

The storage medium 104 may be any form of non-volatile data storage device such as one or more of a hard disk drive, a magnetic disc, an optical disc, a ROM, etc. The storage medium 104 may store an operating system for the processor 108 to execute in order for the computer 102 to function. The storage medium 104 may also store one or more computer programs (or software or instructions or code).

The memory 106 may be any random access memory (storage unit or volatile storage medium) suitable for storing data and/or computer programs (or software or instructions or code).

The processor 108 may be any data processing unit suitable for executing one or more computer programs (such as those stored on the storage medium 104 and/or in the memory 106), some of which may be computer programs according to embodiments of the invention or computer programs that, when executed by the processor 108, cause the processor 108 to carry out a method according to an embodiment of the invention and configure the system 100 to be a system according to an embodiment of the invention. The processor 108 may comprise a single data processing unit or multiple data processing units operating in parallel or in cooperation with each other. The processor 108, in carrying out data processing operations for embodiments of the invention, may store data to and/or read data from the storage medium 104 and/or the memory 106.

The interface 110 may be any unit for providing an interface to a device 122 external to, or removable from, the computer 102. The device 122 may be a data storage device, for example, one or more of an optical disc, a magnetic disc, a solid-state-storage device, etc. The device 122 may have processing capabilities—for example, the device may be a smart card. The interface 110 may therefore access data from, or provide data to, or interface with, the device 122 in accordance with one or more commands that it receives from the processor 108.

The user input interface 114 is arranged to receive input from a user, or operator, of the system 100. The user may provide this input via one or more input devices of the system 100, such as mouse (or other pointing device) 526 and/or a keyboard 125, that are connected to, or in communication with, the user input interface 114. However, it will be appreciated that the user may provide input to the computer 102 via one or more additional or alternative input devices (such as a touch screen). The computer 102 may store the input received from the input devices via the user input interface 114 in the memory 106 for the processor 108 to subsequently access and process, or may pass it straight to the processor 108, so that the processor 108 can respond to the user input accordingly.

The user output interface 112 is arranged to provide a graphical/visual and/or audio output to a user, or operator, of the system 100. As such, the processor 108 may be arranged to instruct the user output interface 112 to form an image/video signal representing a desired graphical output, and to provide this signal to a monitor (or screen or display unit) 120 of the system 100 that is connected to the user output interface 112. Additionally or alternatively, the processor 108 may be arranged to instruct the user output interface 112 to form an audio signal representing a desired audio output, and to provide this signal to one or more speakers 121 of the system 100 that is connected to the user output interface 112.

Finally, the network interface 116 provides functionality for the computer 102 to download data from and/or upload data to one or more data communication networks.

It will be appreciated that the architecture of the system 100 illustrated in FIG. 1 and described above is merely exemplary and that other computer systems 100 with different architectures (for example with fewer components than shown in FIG. 1 or with additional and/or alternative components than shown in FIG. 1) may be used. As examples, the computer system 100 could comprise one or more of: a personal computer; a server computer; a mobile telephone; a tablet; a laptop; a television set; a set top box; a games console; a personal computer; a server computer; other mobile devices or consumer electronics devices; a smart card; etc.

Figure 2:
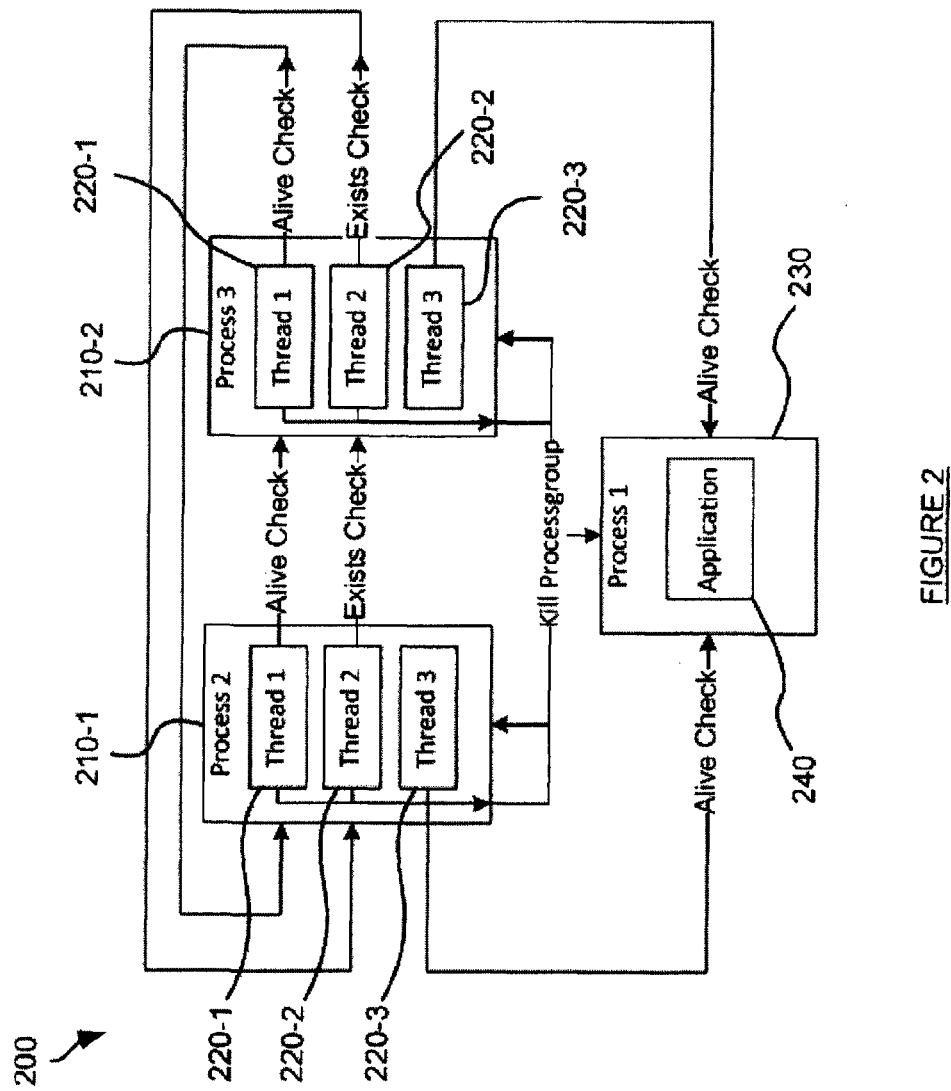
FIG. 2 schematically illustrates, in accordance with one embodiment of the present invention, a protected process group which protects the execution of a software application from reverse-engineering attacks.

FIG. 2 schematically illustrates a protected process group 200 which protects the execution of a software application 240 from reverse-engineering attacks, particularly those attacks that involve the use of a debugger to debug the software application 240. The protected process group 200 comprises a plurality of processes, including a plurality of protection processes 210-1 to 210-p, which are designed to protect the protected process group 200 from reverse-engineering attacks, and a process 230 for executing the software application 240. Please note that, for the purposes of illustration, only two protection processes 210-1 and 210-2 are explicitly shown in figure, but it will be appreciated that any number P of protection processes could be included in the protected process group 200.

The protection processes 210-1 to 210-p are each configured to monitor the state of execution (hereinafter referred to as the process state) of at least one of the other processes in the protected process group (i.e. a process such as the process 230 for running the software application 240 or another protection process 210-1 to 210-p that is not the protection process itself) to determine whether the process state of the other process corresponds to a predetermined process state. The predetermined process state may be a process state which would be produced or triggered by a reverse-engineering attack, such as the use of a debugger, on that other process. If it is determined that the process state of the at least one other process that is being monitored does correspond to the predetermined process state, the protection process is further configured to take a predetermined action. For example, the predetermined action may be designed to interfere with the reverse-engineering attack, so as to frustrate the attack and prevent the attacker meeting their objectives or goals.

The plurality of protection processes 210-1 to 210-p in the protected process group 200 are arranged or configured so that each of the protection processes 210-1 to 210-p is monitored by at least one other protection process in the protected process group 200. Additionally, the plurality of protection processes 210-1 to 210-p are further arranged so that the process 230 for executing the software application 240 is monitored by at least one of the protection processes 210-1 to 210-p. Therefore, a reverse-engineering attempt, such as an attempt at debugging or otherwise interfering with the execution of any of the processes in the protected process group 200, will be detected by one of the (other) protection processes in the protected process group 200. An exemplary arrangement of the protection processes 210-1 to 210-p could be such that the first protection process 210-1 is arranged to monitor the second protection process 210-2, the second protection process 210-2 in turn being arranged to monitor a third protection process 210-3, and so on, with the final protection process 210-p being arranged to monitor the first protection process 210-1. This exemplary arrangement conceptually forms a ring or chain of protection processes with each protection process 210-1 or 210-p in the ring being monitored by the previous protection process in the ring and in turn monitoring the next protection process in the ring. As a further example, the protection processes 210-1 to 210-p could be arranged such that one of the protection processes monitors all of the other protection processes in the protected process group 200, whilst all of the other protection processes in the protected process group 200 monitor that one protection process. This further example could be thought of conceptually as forming a star arrangement. It will be appreciated that there are many other arrangements of protection processes that could be used. In summary, each of the protection processes 210-1 to 210-p is monitored by at least one other protection process in the protected process group 200.

The protection processes 210-1 to 210-p may each comprise one or more threads of execution 220-1, 220-2 to 220-n. In the embodiment of FIG. 2, each protection process 210-1 to 210-p includes three threads of execution 220-1, 220-2 and 220-3. Whilst, for simplicity, the same reference numerals have been used for, e.g. the first thread 220-1 of the first protection process 210-1 and the first thread 220-1 of the second protection process 210-2, it will be appreciated that these threads need not be identical. As discussed above, the protection processes 210-1 to 210-p are each configured to monitor the process state of another process in the protected process group 200. This monitoring may be performed by a thread of execution within the protection process, which may therefore be referred to as a protection thread. The use of a separate thread of execution to perform this monitoring means that the protection process is able to perform other functions at the same time (or at least concurrently) as monitoring other processes. The protection processes may contain multiple protection threads, whereby each protection thread may monitor another process to determine whether the process state of that other process corresponds to a process state that would be triggered by a reverse-engineering attack, such as the use of a software debugging tool. In one embodiment, the protection threads within a given protection process may each be configured to monitor different other processes (i.e. each protection thread within a given protection process may be configured to monitor an other process different than the other processes monitored by the other protection threads). In this way, the protection process may concurrently monitor the process state of a number of other processes. In an alternative embodiment, the protection threads within a protection process may be configured to monitor the same other process, but may be monitoring for different predetermined process states of that other process. In other words, the protection process may make a determination that the other process is being attacked based on a number of different pre-determined states for that other process. In a further alternative embodiment, the two previous embodiments may be combined such that a given protection process may comprise protection threads operable to monitor for a number of different predetermined process states of a number of different other protection processes. It will be appreciated therefore that each protection process may comprise any respective number of protection threads for monitoring any number of other processes for any number of predetermined process states.

The predetermined process state (or states) monitored for by each protection process, or its respective protection threads, is a process state which is indicative of a reverse-engineering attack, such as process states which are indicative of the use of debugger. The process protection group 200 illustrated in FIG. 2, for example, is shown with the protection processes 210-1 and 210-2 monitoring for process states that correspond to the process state of a non-alive process or non-existent process. The detection of either of these two process states (i.e. that the process is not alive or no longer exists) may be indicative of a reverse-engineering attack against the process. It will be appreciated that there are many other process states that may be monitored for to determine whether a process is being reverse-engineered. In particular, any of the anti-debugging techniques described above may be used to monitor for process states that are indicative of the use of a debugger.

Although the description of the monitoring performed by the protection processes has been described above in a positive sense, i.e. that the protection processes monitor for a process state that corresponds to a predetermined process state, it is instead possible that the monitoring may be performed in a negative sense, i.e. that the protection processes monitor for (and therefore subsequently takes action based on) the absence of a particular process state. It will be appreciated that either type of determination may be used and that the choice of which determination is used will be dependent on the nature of the predetermined process state that is being monitored for in relation to a reverse-engineering attack. If for example the predetermined process state is an 'abnormal' process state that is present during a reverse engineering attack (but is not present during normal operation), then the determination may be made positively as to whether the process state corresponds to that 'abnormal' process state to determine that a reverse-engineering attack is occurring. If, however, the predetermined process state is a 'normal' process state that is present during normal operation but not during a reverse engineering attack, then the determination may be made negatively as to whether the process state does not correspond to the 'normal' process state to determine that a reverse-engineering attack is occurring.

The predetermined action that is performed by a protection process, or its respective protection threads, is designed to frustrate a reverse-engineering attack such that the attacker's task is made more difficult and the attacker may be deterred. There are many different predetermined actions that may be taken to achieve this goal. As examples, the predetermined action could comprise terminating the process 230 for running the software application 240 and/or the plurality of protection process 210-1 to 210-$p$. The predetermined action may comprise replacing the software application 240 that is being executed with a different software application which may have limited or alternative functionality so as to confuse the attacker about the functionality of the original software application 240. The predetermined action may comprise raising an exception that cannot be handled or otherwise passing control over to an error handling application. The predetermined action may comprise logging the fact that a reverse-engineering attack has been attempted.

Although the protected process group 200 described above with reference to FIG. 2 comprises a plurality of protection process 210-1 to 210-$p$ and a separate process 230 for executing the software application 240, it is not necessary for the process 230 for executing the software application 240 to be a separate process.

Figure 3:
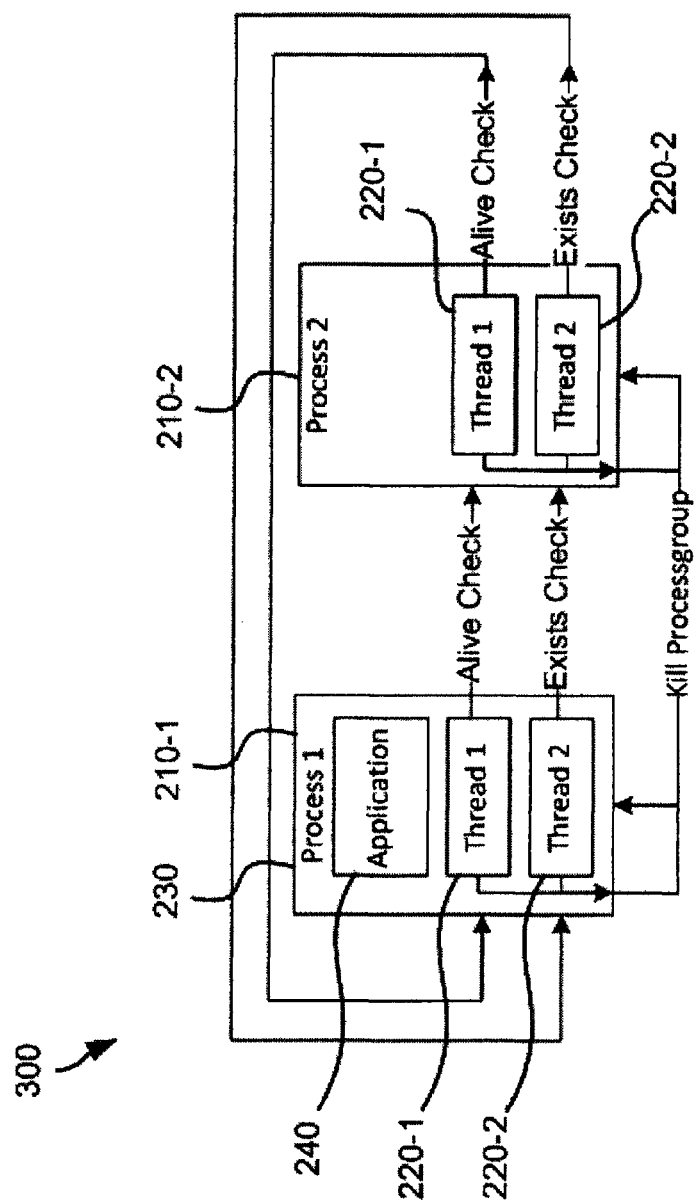
FIG. 3 schematically illustrates a protected process group in accordance with another embodiment of the present invention.

FIG. 3 illustrates a protected process group 300 which is similar to the protected process group 200 illustrated in FIG. 2 except that the protected process group 300 illustrated in figured 3 does not comprise a separate process 230 for executing the software application 240. Instead, in the protected process group 300 of FIG. 3, a first protection process 210-1 of the protection processes also serves as the process 230 for executing the software application 240. This may be achieved by using one or more threads of execution inside the first protection process 210-1 to execute the software application 240. The one or more threads of execution that are used to execute the software application 240 are separate from the protection threads 220-1 to 220-$n$ that may be used to monitor the other protection processes. In this manner the software application may run in parallel to (or at least concurrently with) the monitoring that is also performed by the protection process. Whilst FIG. 3 depicts two protection threads 220-1 and 220-2 per protection process, it will be appreciated that a different number of protection threads could be provided in each protection process.

It will also be appreciated that, other than the feature that the software application is executed in one of the protection processes instead of in a separate process, the features discussed in respect of the protected process group 200 illustrated in FIG. 2 are equally applicable to the protected process group 300 illustrated in FIG. 3. For example, the features discussed in relation to the protected process group 200 illustrated in FIG. 2 for the various arrangements of the protection processes to monitor each other that may be used, and the possibility of using protection threads within a protection process to enable the protection process to monitor any number of other process for any number of predetermined process state, also apply to the protected process group 300 illustrated in FIG. 3.

The inclusion in the protected process group 200 or 300 of multiple protection processes which monitor each other to detect reverse-engineering attacks increases the complexity for an attacker to attack a software application 240 protected by protected process group 200 or 300. This is because instead of being able to simply attack a single process the attacker must instead contemplate the complex inter-operations between multiple processes in order to successfully attack the software application. This means that not only must an attacker identify these other processes and their complex interoperations, but also the attacker must successfully attack each process within the protected process group 200 or 300 before the attack is detected by the monitoring of one of the protection processes 210-1 to 210-$p$ (which would then take an action to frustrate the attack). Thus, a time constraint is introduced within which the attack must be achieved. This requires an attacker to spend a lot more time and effort analysing the software application in order to successfully attack it and is therefore an effective deterrent against reverse-engineering attacks.

Whilst a deterrent against reverse-engineering attacks may be achieved using any number P of protection processes 210-1 to 210-$p$ (as long as there are at least two), the number P of protection processes may be chosen so as to make it particularly difficult for an attacker to attack the software application running in the protected process group. This may be achieved by considering the time $T_{stop}$ that is required by an attacker to attack a process in the protected process group 200 or 300 and the time $T_{detect}$ in which an attack on a process in the protected process group 200 or 300 can be detected by a protection process 210-1 to 210-$p$ of the protected process group 200 or 300. These times will vary depending on a range of factors, such as the processor and operating system of the computer system upon which the protected process group 200 or 300 is being run. The number N of processes in the protection process group 200 illustrated in FIG. 2 is the number P of protection processes 210-1 to 210-$p$ and an additional process 230 for executing the software application 240 (i.e. N=P+1). However, the number N of processes in the protected process group 300 illustrated in FIG. 3 is the same as the number P of protection processes 210-1 to 210-$p$ (i.e. N=P), as there is no separate process 230 for executing the software application 240. If the protected process group 200 or 300 contains a number N of processes, then the time taken to attack the protected process group 200 or 300 will be $N \cdot T_{stop}$. The number P of protection processes may therefore be chosen such that the time taken to attack all of the processes in the protected process group 200 or 300 is greater than the time $T_{detect}$ required to detect the attack (i.e. $T_{detect} < N \cdot T_{stop}$). Selecting a minimum number $P_{minimum}$ of protection processes 210-1 to 210-$p$ to be used in the protected process group 200 or 300 in this manner makes it very much harder for an attacker to circumvent the protected process group 200 or 300 and successfully reverse-engineer the software application that is protected by the protected process group 200 or 300. It will be appreciated that in general the larger the number of processes in the protected process group, the harder it will be for an attacker to attack the protected process group.

The number P of protection processes 210-1 to 210-$p$ in the protected process group 200 or 300 may be varied during the execution of the protected process group 200 or 300. The number P of protection processes may be increased or decreased during the execution of the protected process group 200 or 300. As an example, the number P of protection processes may be increased during the execution of important parts of the software application 240 to improve the security of those parts of the software application 240 against reverse-engineering. During the execution of less important parts of the software application 240, the number P of protection processes may be reduced to lower the processing costs of running the protected process group.

Where the number P of protection processes is varied during the execution of the protected process group, the number $P_{current}$ of protection processes that are executing in the protected process group 200 or 300 at any one time may be maintained such that there are at least the minimum number $P_{minimum}$ of protection processes (which is selected using the criteria discussed above to optimise the difficulty for an attacker to attack the protected process group 200 or 300) are running at all times (i.e. $P_{current} \geq P_{minimum}$).

Figure 4:
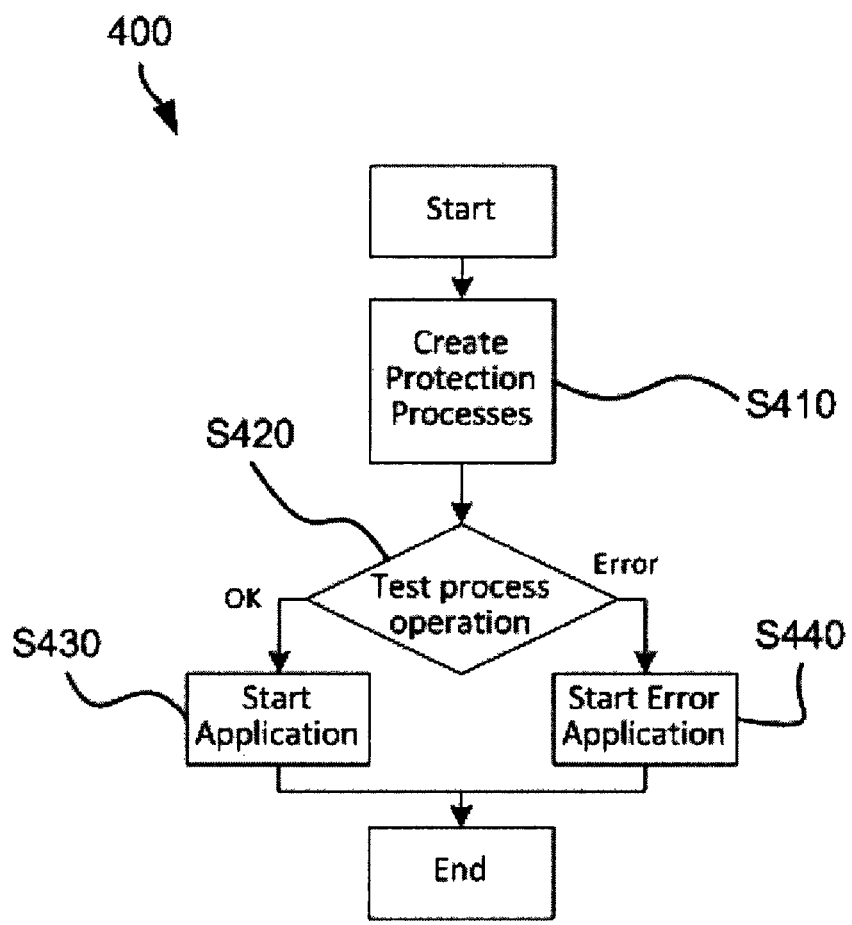
FIG. 4 is a flow diagram schematically illustrating a method in accordance with the present invention for starting the running of a software application as part of a protected process group.

FIG. 4 illustrates a method 400 for starting the running of a software application 240 as part of a protected process group 200 or 300.

At a first step S410, the method creates the protection processes 210-1 to 210-$p$ such that the protection processes 210-1 to 210-$p$ are being executed and the process state of each of the protection processes 210-1 to 210-$p$ is being monitored by at least one of the other protection processes 210-1 to 210-$p$.

This first step S410 may be performed by a small portion of code contained in the software application 240 which executes before the main functionality of the software application is executed (the main functionality to be protected by the protected process group 200 or 300).

Alternatively, when the user wishes to launch or execute the software application 240, the user may be required to launch the software application 240 by executing a different software application (a launching application). The software application 240 that the user wished to launch may be identified to the launching application. The first step S410 to create the protection processes 210-1 to 210-$p$ may then be performed by the launching application before it launches the software application.

Alternatively, the computer system may be arranged such that a protected process group 200 or 300 is run in advance of any software application 240 being launched, without knowledge of the particular software application 240 that is to be executed as part of the protected process group 200 or 300. The protected process group 200 or 300 is therefore created with just the protection processes 210-1 to 210-$p$ and without a process 230 for running the application 240. As an example, the protected process group 200 or 300 may be created as the computer system is booted. However, any other pre-emptive method for creating the protected process group 200 or 300 may be used such that the protected process group 200 or 300 is already running at the point that a user wishes to launch the software application 240.

In summary, at the end of step S410, the main functionality of the software application has not yet been executed and the protection processes 210-1 to 210-$p$ of the protected process group 200 or 300 are monitoring each other to detect any interference with the protection processes 210-1 to 210-$p$.

At a step S420, the method 400 checks each of the protection process 210-1 to 210-$p$ to determine whether their process state is normal, or in other words, to determine whether or not the process state of each protection process 210-1 to 210-$p$ corresponds to a predetermined process state that would result from interference with the operation of the protection processes 210-1 to 210-$p$, such as might occur when someone attempts to reverse engineer the protection processes 210-1 to 210-$p$. If the process state of all the protection processes 210-1 to 210-$p$ is normal, i.e. does not correspond to a predetermined process state, then the method proceeds to a step S430. Otherwise, if interference (such as a reverse-engineering attack) has been detected, then the method proceeds to a step S440 (to be described further below).

At step S430, the application is started under the monitoring of the protection processes 210-1 to 210-$p$. Where step S410 was carried by a small portion of code in the software application 240 that executes before the main functionality of the software application 240, step S430 involves proceeding to execute the main functionality of the software application. Where the protection process 210-1 to 210-$p$ were created by a separate application, or already existed on the computer system, in step S410, step 430 may involve the creation of a separate process 230 in which to execute the software application 240. Alternatively, step 430 may involve creating one or more threads of execution within one of the protection processes 210-1 for executing the software application 240. The process 230 in which the software application 240 is to be run may therefore be considered to be the protection process 210-1 in which the threads for executing the software application 240 were created. Where the protected process group 200 or 300 is created in step S410 without knowledge of the particular software application 240 that is to be executed as part of the protected process group 200 or 300, step S430 may involve the software application 240, upon its execution, identifying itself to the protection process group so that the protection processes 210-1 to 210-$p$ can configure themselves to monitor the process 230 that is running the software application 240.

In summary, at step S430 the software application 240 is run under the monitoring of the protection processes 210-1 to 210-$p$.

If it was determined at the preceding step S420 that one or more of the protection processes 210-1 to 210-$p$ have been interfered with such that their process state corresponds to a process state that would occur as a result of a reverse-engineer attack, then step S440 occurs instead of step S430.

At step S440, the method takes a predetermined action which is designed to frustrate a reverse-engineering attack that may be occurring. As discussed above, there are many different predetermined actions that could be used. In addition to the above-mentioned examples, some further examples of predetermined actions that may be taken in step S440 include preventing the software application from being launched, or launching a different software application, or causing a different execution path to be followed through the software application 240. This change may be imperceptible to the attacker, but will prevent the attacker from gaining a true understanding of the software application 240 during the reverse-engineering attack.

The method 400 for starting the running of a software application 240 as part of a protected process group 200 or 300, or any number of constituent steps S410, S420, S430 or S440, as described above, may be implemented in code in an obfuscated manner using software transformation techniques. Through such obfuscation, any attacks which attempt to tamper (or interfere) with the operation of method 400 or its constituent steps S410, S420, S430 or S440, for example to prevent the creation of the protected process group 200 or 300, are made much more difficult.

This approach to protecting the execution of a software application 240 means that the software application 240 can be adapted to be protected from reverse-engineering attacks with only minimal modification to the code of the software application 240. In embodiments where a separate launching application is used to launch the software application, it may be possible to obtain protection from reverse-engineering attacks without needing to modify the code of the software application 240 at all. This leads to reduced development time, effort and cost. Furthermore, the protection from reverse-engineering attacks that is provided is largely independent from the software applications themselves and can be made more uniform and easier to maintain.

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, set top box, television, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements. Method steps implemented in flowcharts contained herein, or as described above, may each be implemented by corresponding respective modules; multiple method steps implemented in flowcharts contained herein, or as described above, may together be implemented by a single module.

It will be appreciated that, insofar as embodiments of the invention are implemented by a computer program, then a storage medium and a transmission medium carrying the computer program form aspects of the invention. The computer program may have one or more program instructions, or program code, which, when executed by a computer carries out an embodiment of the invention. The term "program," as used herein, may be a sequence of instructions designed for execution on a computer system, and may include a subroutine, a function, a procedure, a module, an object method, an object implementation, an executable application, an applet, a servlet, source code, object code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A method, implemented by one or more processors, of protecting the execution of a software application, the method including a plurality of computer executed processes comprising a process for executing the software application by the one or more processors and a plurality of protection processes, wherein each protection process in the plurality of protection processes is configured to:
   monitor a state of execution of at least one other process in the plurality of processes to determine whether said state of execution corresponds to a predetermined state of execution; and
   perform a predetermined action in response to a determination that said state of execution corresponds to the predetermined state of execution;
   wherein the plurality of protection processes are configured such that a state of execution of the process for executing the software application is monitored by at least one protection process and a state of execution of each protection process is monitored by at least one other protection process in the plurality of protection processes.

2. The method of claim 1, wherein each protection process is further configured to monitor the state of execution of the at least one other process to determine whether said state of execution corresponds to a second predetermined state of execution.

3. The method of claim 1, wherein one of the plurality of protection processes comprises the process for executing the software application.

4. The method of claim 1, wherein the predetermined state of execution corresponds to a state of execution that is indicative of a reverse-engineering attack.

5. The method of claim 1, wherein the predetermined action comprises one or more of: causing the execution of the software application to be terminated; causing the execution of the software application to be passed to an error handling component; and/or causing the execution of the plurality of protection processes to be terminated.

6. The method of claim 1, wherein the plurality of protection processes are generated and executed before the software application is executed such that each protection process is being monitored by at least one other protection process in the plurality of protection processes prior to the software application being executed.

7. The method of claim 6, wherein, prior to execution of the software application, the predetermined action comprises causing the execution of the software application to be prevented.

8. The method of claim 6, wherein the software application is configured to identify itself to the plurality of protection processes when it is executed, such that the plurality of protection processes can monitor the process state of execution of the process for executing the software application.

9. The method of claim 1, wherein each protection process is configured to monitor one other protection process and is in turn monitored by one other protection process, such that the plurality of protection processes forms a ring structure.

10. The method of claim 1, wherein the number of protection processes in the plurality of processes varies during the execution of the software application.

11. The method of claim 1, wherein the number of protection processes in the plurality of processes is such that a total time required to attack the plurality of processes is greater than a time taken by any one process in the plurality of protection processes to determine that the state of execution of the at least one other process being monitored corresponds to the predetermined state of execution.

12. One or more non-transitory computer readable media comprising computer program code which, when executed by a processor, causes the processor to carry out a method to protect the execution of a software application, the method including a plurality of computer executed processes comprising a process for executing the software application by the one or more processors and a plurality of protection processes, wherein each protection process in the plurality of protection processes is configured to:
   monitor a state of execution of at least one other process in the plurality of processes to determine whether said state of execution corresponds to a predetermined state of execution; and
   perform a predetermined action in response to a determination that said state of execution corresponds to the predetermined state of execution;
   wherein the plurality of protection processes are configured such that a state of execution of the process for executing the software application is monitored by at least one protection process and a state of execution of each protection process is monitored by at least one other protection process in the plurality of protection processes.

13. A system comprising one or more processors configured to carry out a method to protect the execution of a software application, the method including a plurality of computer executed processes comprising a process for executing the software application by the one or more processors and a plurality of protection processes, wherein each protection process in the plurality of protection processes is configured to:
   monitor a state of execution of at least one other process in the plurality of processes to determine whether said state of execution corresponds to a predetermined state of execution; and
   perform a predetermined action in response to a determination that said state of execution corresponds to the predetermined state of execution;
   wherein the plurality of protection processes are configured such that a state of execution of the process for executing the software application is monitored by at least one protection process and a state of execution of each protection process is monitored by at least one other protection process in the plurality of protection processes.

* * * * *